(12) United States Patent
Hsieh

(10) Patent No.: US 7,832,285 B2
(45) Date of Patent: Nov. 16, 2010

(54) ELECTRONIC TORQUE METER

(76) Inventor: Chih-Ching Hsieh, No. 367, Pei Yang Road, Feng Yuan, Taichung Hsien (TW)

( * ) Notice: Subject to any disclaimer, the term of this patent is extended or adjusted under 35 U.S.C. 154(b) by 246 days.

(21) Appl. No.: 12/326,352

(22) Filed: Dec. 2, 2008

(65) Prior Publication Data

US 2010/0107779 A1    May 6, 2010

(30) Foreign Application Priority Data

Nov. 6, 2008   (TW) ............................. 97142899 A

(51) Int. Cl.
*B25B 23/14* (2006.01)
(52) U.S. Cl. .................................. 73/862.21
(58) Field of Classification Search .. 73/862.21–862.23
See application file for complete search history.

(56) References Cited

U.S. PATENT DOCUMENTS

| | | | | |
|---|---|---|---|---|
| 2,497,756 A | * | 2/1950 | Billeter | ..................... 73/862.21 |
| 4,376,386 A | * | 3/1983 | Green | ........................ 73/1.12 |
| 5,353,654 A | * | 10/1994 | Lin | ............................ 73/865.9 |
| 5,911,154 A | | 6/1999 | Hsieh | |
| 6,772,645 B2 | | 8/2004 | Hsien | |

* cited by examiner

*Primary Examiner*—Lisa M Caputo
*Assistant Examiner*—Octavia Davis
(74) *Attorney, Agent, or Firm*—Ming Chow; Sinorica, LLC

(57) ABSTRACT

The invention provides an electronic torque meter for measuring torque of a wrench. The torque meter includes a housing in which an operation shaft and a flexible beam are disposed. When the operation shaft is rotated, the flexible beam is flexed. A measuring element is mounted on the flexible beam for detecting and measuring flexure of the flexible beam. An electronic display unit is mounted on the housing and electrically connected with the measuring element. When measuring the torque of a wrench, the measuring element directly measures the flexure and deformation of the flexible beam to obtain precise torque value. The torque value is displayed by the display unit in the form of numerals for easy reading.

17 Claims, 5 Drawing Sheets

ELECTRONIC TORQUE METER

FIELD OF THE INVENTION

The present invention is related to a test instrument, and more particularly to an electronic instrument for measuring torque value of a wrench.

BACKGROUND OF THE INVENTION

It is known that when designing a wrench, the torque value of the wrench must be tested and measured as the basis for the structural design of the wrench.

U.S. Pat. Nos. 5,911,154 and 6,772,645 designed by the inventor disclose torque meters for testing and measuring torque of a wrench. The conventional torque meter has a housing, an operation shaft and a flexible beam. The operation shaft and the flexible beam are installed in the housing. One end of the flexible beam is inserted in the operation shaft. A dial gauge is mounted on a top face of the housing. A probe of the dial gauge extends into the housing to contact with the flexible beam. When a wrench is fitted on the operation shaft and wrenched, the flexible beam is flexed to push the probe of the dial gauge. The probe then drives an indicator of the dial gauge through an internal mechanism thereof. The indicator then indicates a scale representing the torque value corresponding to the flexure of the flexible beam.

The conventional torque meter has a simply mechanical structure. That is, the whole the torque meter is simply composed of multiple mechanical components including the flexible beam, the probe pushed by the flexible beam, the internal mechanism pushed by the probe and the indicator driven by the internal mechanism. These components cooperate to show the torque value in a mechanical manner. Each of these components has a mechanical tolerance. The more the number of the components is, the large the total mechanical tolerance is. As a result, the error of the measured data is increased to lower the precision. Also, the sensitivity of the torque meter is affected.

Moreover, an operator needs to wrench the wrench on one hand and at the same time watch the scale of the gauge on the other hand. Therefore, it is quite difficult for the operator to read the scale representing the torque value, which is indicated by the indicator. The experiences tell that when watching the gauge, the observed value often varies with the watching height and angle. Furthermore, it is hard to clearly and precisely read the value behind the decimal point.

SUMMARY OF THE INVENTION

It is therefore a primary object of the present invention to provide a torque meter with higher precision.

It is a further object of the present invention to provide the above torque meter, which enables a user to more conveniently and precisely read the measured torque value.

According to the above objects, the torque meter of the present invention includes: a housing; an operation shaft rotatably disposed on two sides of the housing; a flexible beam positioned in the housing, a front end of the flexible beam being fixedly connected with the operation shaft, a rear end of the flexible beam being restricted by a fulcrum; a measuring element mounted on the flexible beam for detecting and measuring flexure of the flexible beam; and an electronic display unit mounted on the housing and electrically connected with the measuring element. When measuring torque of a wrench, the measuring element directly measures the flexure and deformation of the flexible beam to obtain precise torque value. The torque value is displayed by the display unit in the form of numerals for easy reading.

The present invention can be best understood through the following description and accompanying drawings wherein:

DETAILED DESCRIPTION OF THE PREFERRED EMBODIMENTS

Figure 1:
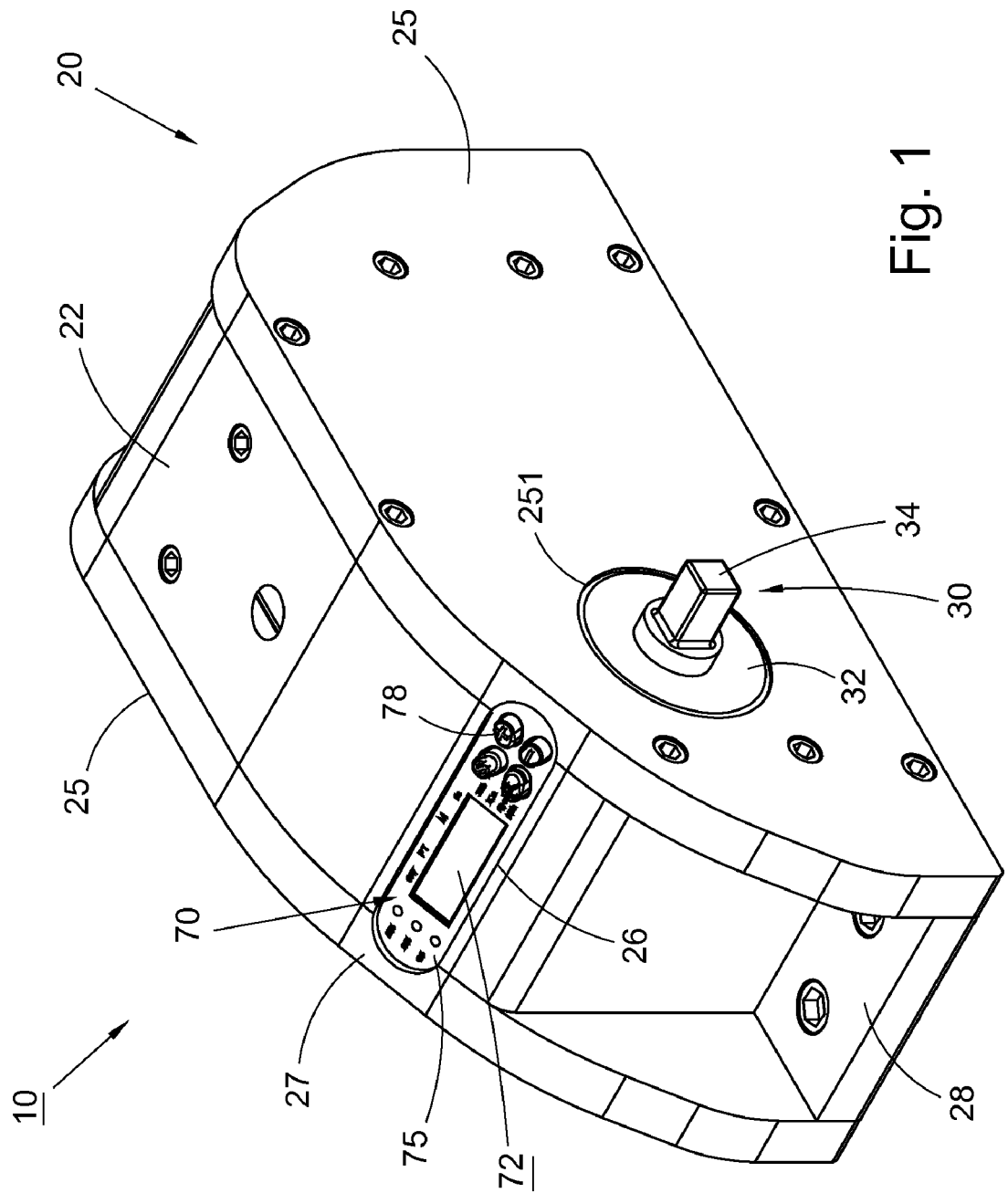
FIG. 1 is a perspective view of a preferred embodiment of the present invention.
Figure 2:
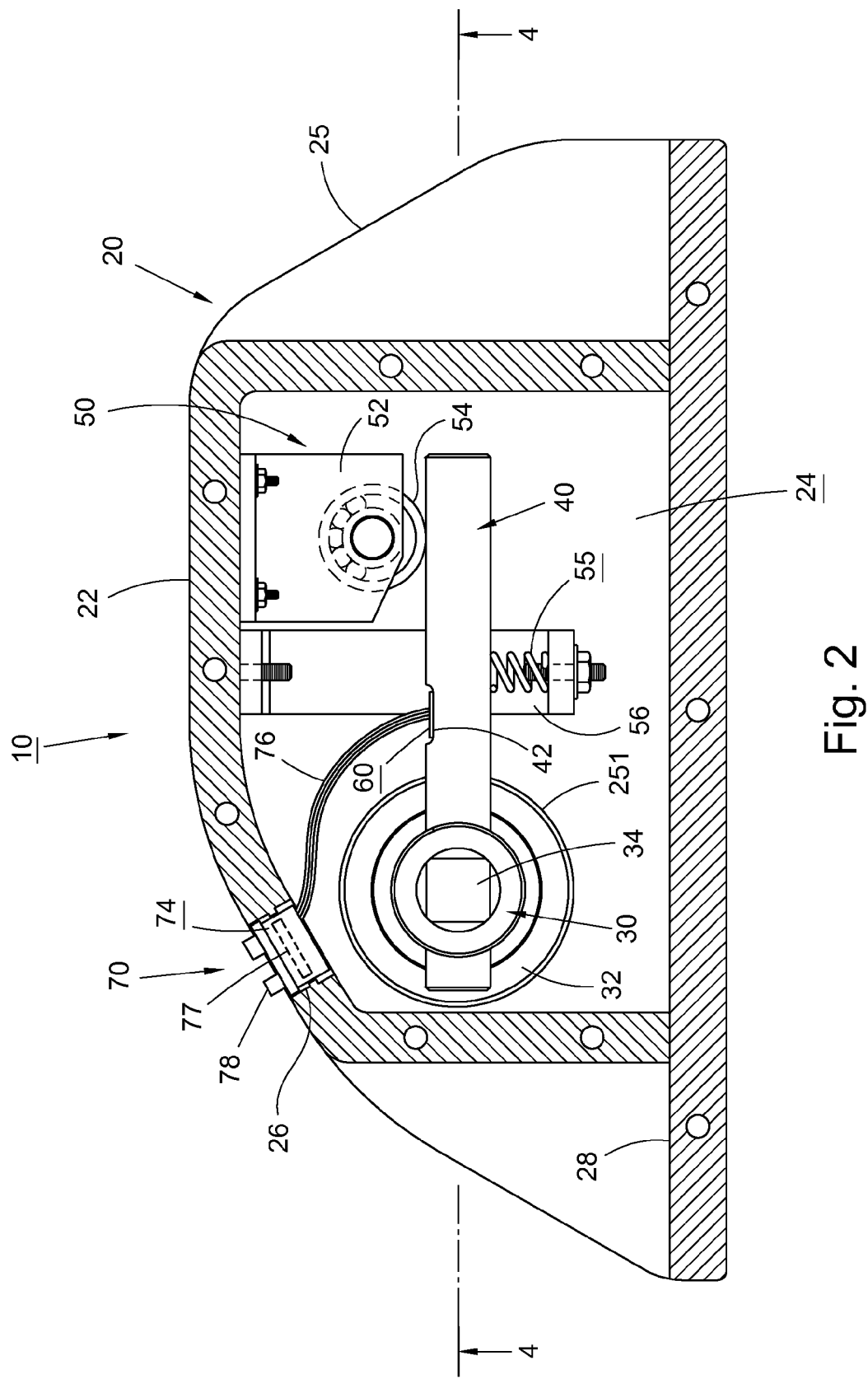
FIG. 2 is a longitudinally sectional view of the preferred embodiment of the present invention according to FIG. 1.

Please refer to FIGS. 1 and 2. According to a preferred embodiment, the torque meter 10 of the present invention is an electronic torque meter, which includes a housing 20, an operation shaft 30, a flexible beam 40, a measuring element 60 and an electronic display unit 70

The housing 20 is composed of a casing 22 and two side boards 25. The casing has two open sides and defines an internal installation space 24. The two side boards 25 are disposed on the two open sides of the casing to cover the open sides. A window 26 is formed on the casing in communication with the installation space 24. Preferably, the window 26 is positioned on a front side of a top wall of the casing. In this embodiment, a slope 27 is formed on the front side of the top wall of the casing. The window 26 is positioned on the slope 27.

Figure 3:
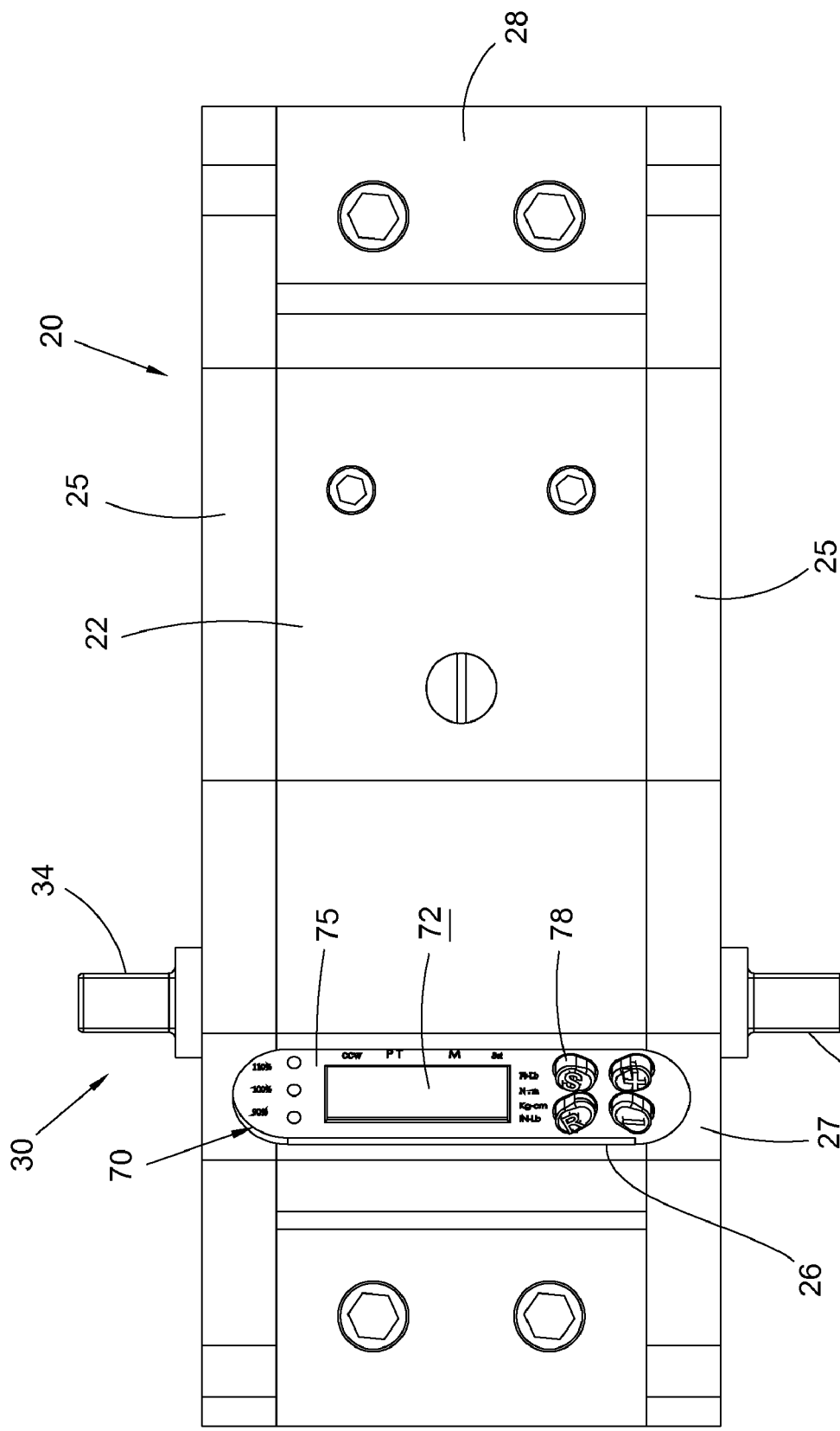
FIG. 3 is a top view according to FIG. 1.

The operation shaft 30 passes through two sides of the housing 20. Each side board 25 is formed with a through hole 251 in which a bearing 32 is disposed. The operation shaft is rotatably fitted in the bearings 32. Each of two ends of the operation shaft has a fitting section 34. The fitting sections 34 protrude from two sides of the housing 20 respectively as shown in FIG. 3. Each fitting section 34 can be a polygonal boss or a polygonal socket for a wrench to fit thereon or insert therein.

Figure 4:
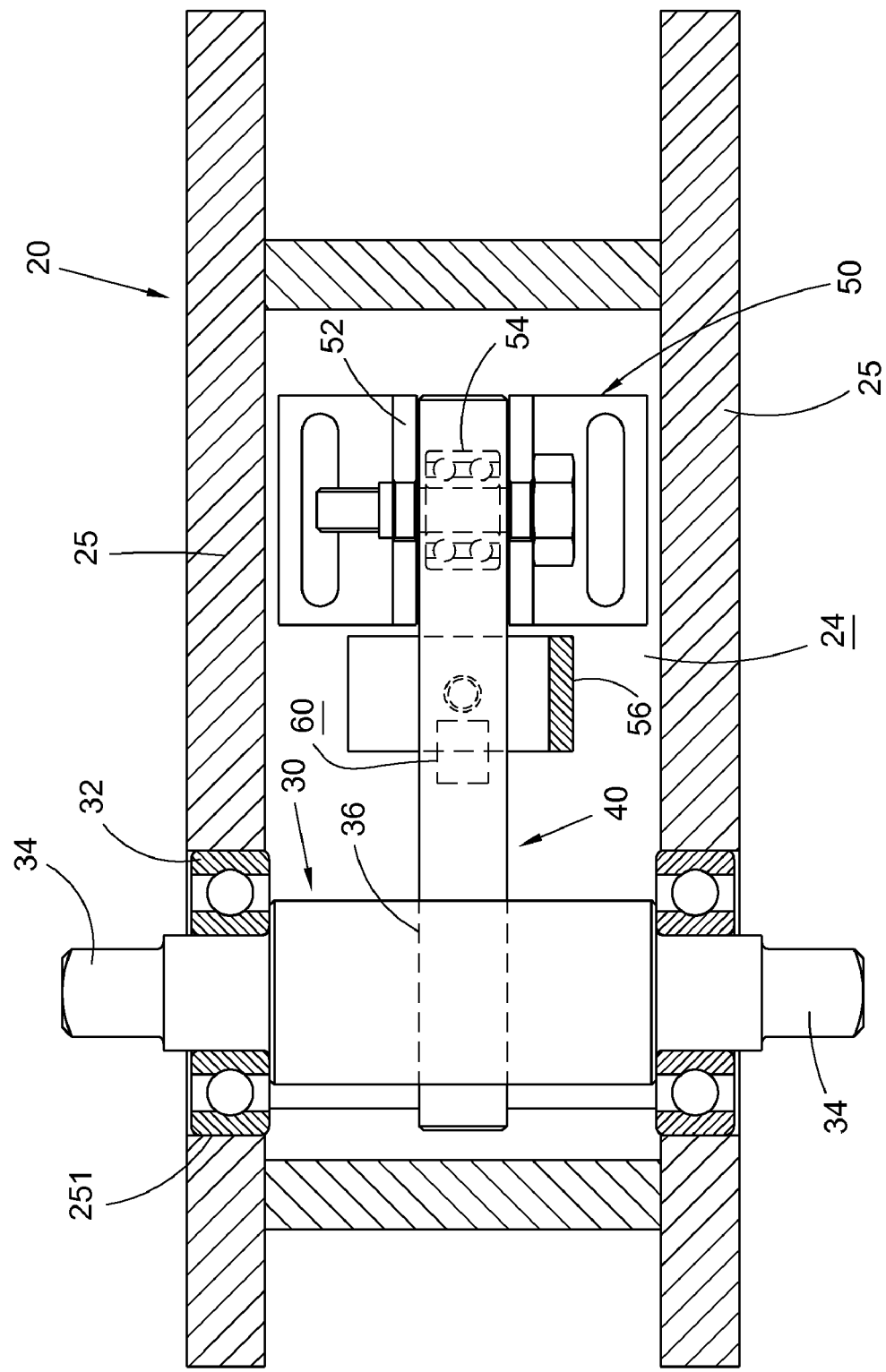
FIG. 4 is a sectional taken along line 4-4 of FIG. 2.

The flexible beam 40 is positioned in the installation space 24. A front end of the flexible beam 40 is inserted in a radial insertion hole 36 of the operation shaft 30 as shown in FIG. 4. A circumference of the flexible beam 40 is formed with a rest plane face 42 as shown in FIG. 2.

A fulcrum 50 is composed of a support 52 and a rotary member 54 (such as a bearing) rotatably disposed on the support 52. The support 52 is fixed on an inner face of the top wall of the housing 20. The rotary member 54 is directed to the flexible beam 40 for contacting therewith.

A resilient member 55 resiliently abuts against the flexible beam 40, whereby a rear end of the flexible beam keeps in contact with the fulcrum 50. A top end of a second support 56 is fixed on an inner face of the housing 20. The resilient member 55 is mounted on a bottom end of the support 56. One end of the resilient member 55 abuts against the support 56, while the other end of the resilient member 55 abuts against the flexible beam 40.

The measuring element 60, as shown in FIGS. 2 and 4, can be a tension meter or a strain gauge for generating electronic signal (such as resistance or potential signal). The measuring element 60 serves to convert flexure or deformation of an article into electric signal. The measuring element 60 is firmly located on the rest plane face 42 of the flexible beam 40 for accurately detecting and measuring the flexure of the flexible beam.

The electronic display unit 70, as shown in FIG. 1, has an electronic display screen 72 such as an LCD. The display unit 70 further has a hollow frame body 74 as shown in FIG. 2. A panel 75 is arranged on a front face of the frame body 74. The display screen 72 is installed in the frame body 74 and exposed to outer side through a window of the panel 75. The frame body 74 is mounted in the window 26 of the housing 20 and positioned on the slope 27 for a user to conveniently watch the display screen. The measuring element 60 is electrically connected with the display screen 72 via an electric wire 76 and a circuit unit (not shown). The value detected and measured by the measuring element is converted by the circuit unit into numerals, which are displayed on the display screen. The circuit unit can be a circuit board 77 installed in the housing or the frame body 74 as shown in FIG. 2. Several press keys 78 can be arranged on the panel 75 for providing functions such as numeral resetting, storage, switching between metric system and British system.

Figure 5:
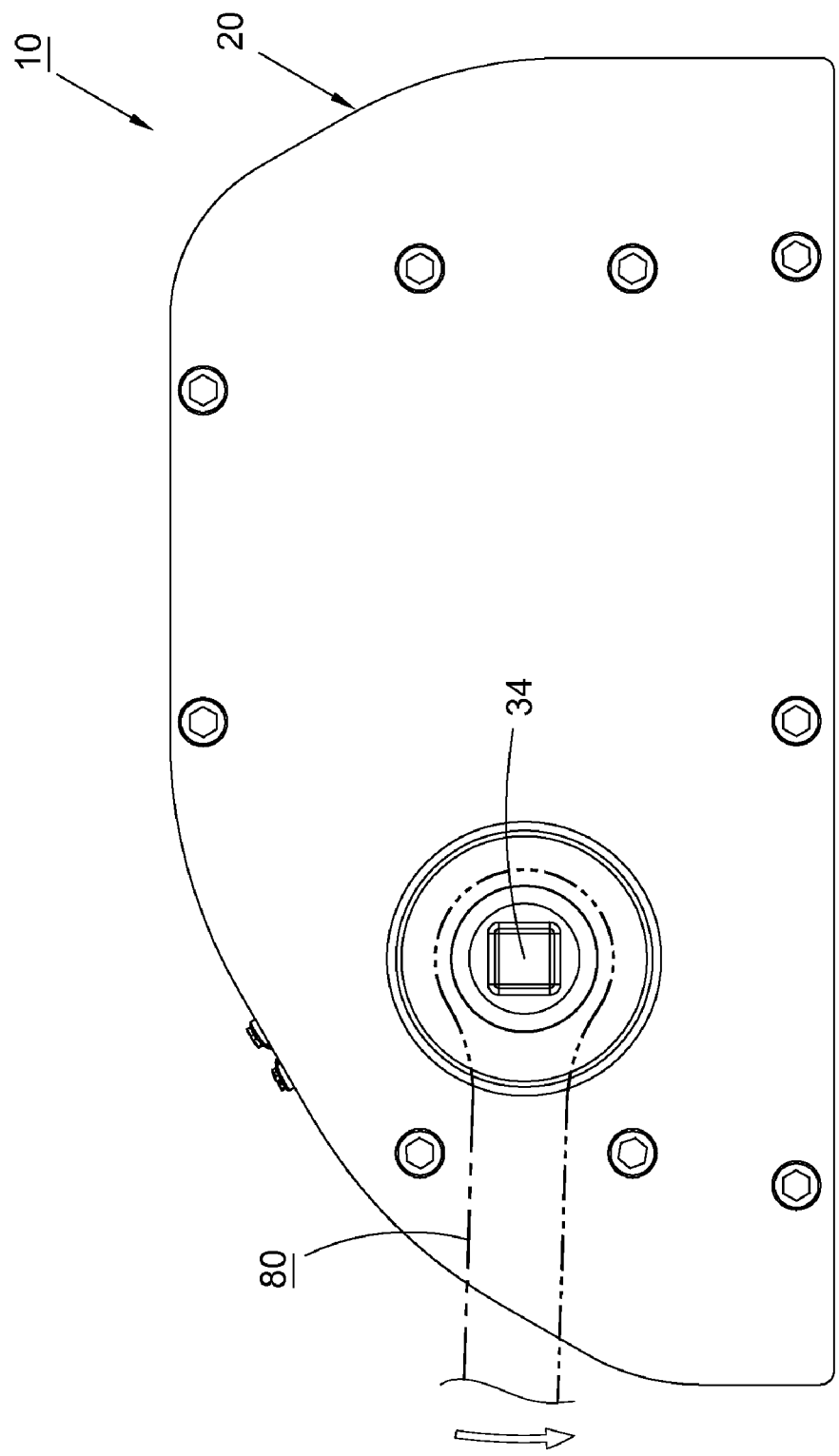
FIG. 5 is a side view according to FIG. 1, showing the use of the present invention.

A bottom wall 28 of the torque meter 10 is fixed in a certain position. When it is desired to measure the torque of a wrench, the wrench 80 can be fitted on the fitting section 34 on one side of the torque meter 10 as shown in FIG. 5. When wrenching the wrench, the operation shaft 30 is rotated to flex the flexible beam 40. The rear end of the flexible beam 40 is restricted by the fulcrum 50 so that the flexible beam 40 is flexed. The measuring element 60 is able to detect and measure the flexure and deformation of the flexible beam. The value detected and measured by the measuring element 60 is converted by the circuit unit into numerals, which are displayed on the display screen 72. Accordingly, during wrenching of the wrench, a user can see the torque value in the form of numerals.

By means of the present invention, the flexure of the flexible beam is directly measured by the measuring element. Therefore, the error of the measured value due to the tolerances of numerous mechanical parts can be minimized to obtain precise data. Moreover, the sensitivity of the torque meter can be enhanced.

Furthermore, the torque value is directly shown in the form of numerals so that a user can more easily and conveniently read the value even if there are digits behind the decimal point. Therefore, the human error and inconvenience caused when reading the scales can be avoided.

The above embodiments are only used to illustrate the present invention, not intended to limit the scope thereof. Many modifications of the above embodiments can be made without departing from the spirit of the present invention.

What is claimed is:

1. An electronic torque meter comprising:
   a housing having an internal installation space and a window formed on a wall of the housing in communication with the installation space;
   an operation shaft rotatably disposed on two sides of the housing; at least one end of the operation shaft having a fitting section, the fitting section protruding from one side of the housing;
   a flexible beam positioned in the installation space, a front end of the flexible beam being fixedly connected with the operation shaft in a radial direction of the operation shaft;
   a fulcrum disposed in the installation space of the housing, a rear end of the flexible beam being restricted by the fulcrum;
   a measuring element for generating electronic signal, the measuring element being mounted on the flexible beam for detecting and measuring flexure of the flexible beam;
   an electronic display unit having an electronic display screen, the display unit being mounted in the window of the housing; and
   a circuit unit; the measuring element being electrically connected with the electronic display unit via the circuit unit.

2. The electronic torque meter as claimed in claim 1, wherein a circumference of the flexible beam is formed with a rest plane face on which the measuring element is disposed.

3. The electronic torque meter as claimed in claim 2, wherein the electronic display unit further has a hollow frame body; the display screen being installed in the frame body, the frame body being mounted in the window of the housing.

4. The electronic torque meter as claimed in claim 3, wherein the circuit unit is disposed in the frame body.

5. The electronic torque meter as claimed in claim 3, wherein the window is positioned on a front side of a top wall of the housing.

6. The electronic torque meter as claimed in claim 5, wherein a slope is formed on the front side of the top wall of the housing; the window is positioned on the slope.

7. The electronic torque meter as claimed in claim 3, further comprising a resilient member disposed in the installation space to resiliently abut against the flexible beam, whereby the rear end of the flexible beam keeps in contact with the fulcrum.

8. The electronic torque meter as claimed in claim 3, wherein the measuring element is a tension meter or a strain gauge.

9. The electronic torque meter as claimed in claim 1, wherein the electronic display unit further has a hollow frame body; the display screen being installed in the frame body, the frame body being mounted in the window of the housing.

10. The electronic torque meter as claimed in claim 9, wherein the circuit unit is disposed in the frame body.

11. The electronic torque meter as claimed in claim 9, wherein the electronic display unit is installed with press keys.

12. The electronic torque meter as claimed in claim 1, wherein the window is positioned on a front side of a top wall of the housing.

13. The electronic torque meter as claimed in claim 12, wherein a slope is formed on the front side of the top wall of the housing; the window is positioned on the slope.

14. The electronic torque meter as claimed in claim 1, further comprising a resilient member disposed in the installation space to resiliently abut against the flexible beam, whereby the rear end of the flexible beam keeps in contact with the fulcrum.

15. The electronic torque meter as claimed in claim 1, wherein the fulcrum includes a support and a rotary member rotatably disposed on the support, the support being fixed on a inner face of a wall of the housing, the rotary member being in contact with the rear end of the flexible beam.

16. The electronic torque meter as claimed in claim 1, wherein the housing includes a casing and at least one side board, at least one side of the casing being an open side; the installation space being defined in the casing; the side board being disposed on the open side of the casing to cover the open side.

17. The electronic torque meter as claimed in claim 1, wherein the measuring element is a tension meter or a strain gauge.

* * * * *